(12) United States Patent
Feulner

(10) Patent No.: US 11,339,678 B2
(45) Date of Patent: May 24, 2022

(54) SYSTEMS AND METHODS FOR CONTROLLING BLADE TIP CLEARANCES

(71) Applicant: UNITED TECHNOLOGIES CORPORATION, Farmington, CT (US)

(72) Inventor: Matthew R. Feulner, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 523 days.

(21) Appl. No.: 16/039,475

(22) Filed: Jul. 19, 2018

(65) Prior Publication Data
US 2020/0025019 A1 Jan. 23, 2020

(51) Int. Cl.
B64C 13/18 (2006.01)
B64D 31/06 (2006.01)
G05D 1/06 (2006.01)
G06Q 10/06 (2012.01)
F01D 5/12 (2006.01)
F01D 11/20 (2006.01)
F01D 11/22 (2006.01)
F02K 3/06 (2006.01)

(52) U.S. Cl.
CPC .......... F01D 11/20 (2013.01); F02K 3/06 (2013.01); F05D 2220/323 (2013.01); F05D 2240/307 (2013.01); F05D 2240/55 (2013.01); F05D 2260/80 (2013.01); F05D 2270/20 (2013.01); F05D 2270/42 (2013.01)

(58) Field of Classification Search
None
See application file for complete search history.

(56) References Cited

U.S. PATENT DOCUMENTS

| 5,005,352 | A | 4/1991 | Schwarz et al. | |
| 8,296,037 | B2 | 10/2012 | Plunkett et al. | |
| 9,657,587 | B2 | 5/2017 | Bacic et al. | |
| 9,758,252 | B2 | 9/2017 | Adibhatla et al. | |
| 2011/0184623 | A1* | 7/2011 | De Boer | B64D 31/12 701/99 |

(Continued)

FOREIGN PATENT DOCUMENTS

| EP | 2025878 | 2/2009 |
| EP | 2881546 | 6/2015 |
| GB | 2552048 | 1/2018 |

OTHER PUBLICATIONS

European Patent Office, European Search Report dated Dec. 5, 2019 in Application No. 19186732.4.

(Continued)

Primary Examiner — Adam D Tissot
Assistant Examiner — Laura E Linhardt
(74) Attorney, Agent, or Firm — Snell & Wilmer L.L.P.

(57) ABSTRACT

A system for controlling blade tip clearances in a gas turbine engine may comprise an active clearance control system and a controller in operable communication with the active clearance control system. The controller may be configured to identify a cruise condition, reduce a thrust limit of the gas turbine engine to a de-rated maximum climb thrust, determine a first target tip clearance based on the de-rated maximum climb thrust, and send a command signal correlating to the first target tip clearance to the active clearance control system.

11 Claims, 7 Drawing Sheets

(56) References Cited

U.S. PATENT DOCUMENTS

| | | | |
|---|---|---|---|
| 2013/0327014 A1* | 12/2013 | Moulebhar | F02K 3/065 |
| | | | 60/226.2 |
| 2015/0159499 A1* | 6/2015 | Bacic | F01D 11/20 |
| | | | 415/1 |
| 2017/0152054 A1* | 6/2017 | Consola | B64D 31/06 |
| 2018/0258785 A1* | 9/2018 | Schelfaut | B64D 27/10 |
| 2018/0266269 A1* | 9/2018 | Blakeman | F01D 11/14 |
| 2019/0121369 A1* | 4/2019 | DiRusso | B64C 13/18 |

OTHER PUBLICATIONS

European Patent Office, European Office Action dated Sep. 15, 2020 in Application No. 19186732.4.

\* cited by examiner

SYSTEMS AND METHODS FOR CONTROLLING BLADE TIP CLEARANCES

FIELD

The present disclosure relates generally to gas turbine engines and, more specifically, to systems and methods for controlling rotor blade tip clearances in gas turbine engines.

BACKGROUND

Gas turbine engines typically include a fan section that delivers air into a compressor. The air is compressed in the compressor and delivered into a combustion section where it is mixed with fuel and ignited. Products of this combustion pass downstream over turbine blades, driving the blades to rotate. Turbine rotors, in turn, drive the compressor and fan rotors. The efficiency of the engine may be increased by ensuring that the products of combustion pass across the turbine blades.

Leakage over the tips of the blades can be minimized by maintaining a desired or predetermined clearance between the blade tips and a casing structure, for example, a blade outer air seal (BOAS), located radially outward of the blade tips. Active clearance control (ACC) systems may be employed to control the tip clearance at different operational conditions. For example, at cruise conditions, ACC systems may maintain the tip clearances at a preselected minimum distance. The minimum distance may be selected to allow for a throttle advance to a maximum climb (MCL) thrust, such as during a step-climb, while avoiding contact or "rub" between the blade tips and the casing structure at rotor speeds associated with the MCL thrust.

SUMMARY

A system for controlling blade tip clearance in a gas turbine engine is disclosed herein. In accordance with various embodiments, the system may comprise an active clearance control system configured to regulate a tip clearance between a blade of the gas turbine engine and a shroud structure radially outward of the blade. A controller may be in operable communication with the active clearance control system. An operational data source may be in communication with the controller. A tangible, non-transitory memory may be configured to communicate with the controller. The tangible, non-transitory memory may have instructions stored thereon that, in response to execution by the controller, cause the controller to perform operations comprising identifying, by the controller, a cruise condition, reducing, by the controller, a thrust limit of the gas turbine engine to a de-rated maximum climb thrust, determining, by the controller, a first target tip clearance based on the de-rated maximum climb thrust, and commanding, by the controller, the active clearance control system to set the tip clearance to the first target tip clearance.

In various embodiments, the operations may further comprise identifying, by the controller, a throttle advance, and commanding, by the controller, the active clearance control system to set the tip clearance to a second target tip clearance. The second target tip clearance may be greater than the first target tip clearance. The operations may further comprise increasing, by the controller, the thrust limit of the gas turbine engine to a maximum climb thrust.

In various embodiments, identifying, by the controller, the throttle advance may comprise receiving, by the controller, a data signal from the operational data source, determining, by the controller, a thrust of the gas turbine engine based on the data signal, and determining, by the controller, the thrust of the gas turbine engine is at the de-rated maximum climb thrust for a preselected length of time.

In various embodiments, the operations may further comprise identifying, by the controller, a non-cruise condition, commanding, by the controller, the active clearance control system to set the tip clearance to a second target tip clearance. The second target tip clearance may be greater than the first target tip clearance. The operations may further comprise increasing, by the controller, the thrust limit of the gas turbine engine to a maximum climb thrust.

In various embodiments, identifying, by the controller, the non-cruise condition may comprise receiving, by the controller, a data signal from the operational data source, determining, by the controller, a flight parameter based on the data signal, and determining, by the controller, the flight parameter is outside a predetermined range for a preselected length of time.

In various embodiments, identifying, by the controller, the cruise condition may comprise receiving, by the controller, a first data signal from the operational data source, determining, by the controller, a flight parameter based on the first data signal, and determining, by the controller, the flight parameter is within a first predetermined range for a first preselected length of time.

In various embodiments, identifying, by the controller, the cruise condition may further comprise receiving, by the controller, a second data signal from the operational data source, determining, by the controller, an operating parameter of the gas turbine engine based on the second data signal, and determining, by the controller, the operating parameter of the gas turbine engine is within a second predetermined range for a second preselected length of time.

In various embodiments, the operations may further comprise determining, by the controller, the de-rated maximum climb thrust by reducing a maximum climb thrust by a preselected percentage. In various embodiments, the operations may further comprise receiving, by the controller, a data signal corresponding to a minimum thrust at the cruise condition, and determining, by the controller, the de-rated maximum climb thrust by increasing the minimum thrust by a preselected percentage.

A gas turbine engine is also disclosed herein. In accordance with various embodiments, the gas turbine engine may comprise a combustor and a turbine aft of the combustor. The turbine may comprise a blade configured to rotate about an axis, and a shroud structure disposed radially outward of the blade. A controller may be configured to regulate a tip clearance between the blade and the shroud structure. A tangible, non-transitory memory may be configured to communicate with the controller. The tangible, non-transitory memory may have instructions stored thereon that, in response to execution by the controller, cause the controller to perform operations comprising identifying, by the controller, a cruise condition, reducing, by the controller, a thrust limit of the gas turbine engine to a de-rated maximum climb thrust, determining, by the controller, a first target tip clearance based on the de-rated maximum climb thrust, and sending, by the controller, a first command signal configured to locate the shroud structure at the first target tip clearance.

In various embodiments, the operations may further comprise identifying, by the controller, a throttle advance, and sending, by the controller, a second command signal configured to locate the shroud structure at a second target tip clearance. The second target tip clearance may be greater than the first target tip clearance. The operations may further comprise increasing, by the controller, the thrust limit of the gas turbine engine to a maximum climb thrust.

In various embodiments, the operations may further comprise identifying, by the controller, a non-cruise condition, and sending, by the controller, a second command signal configured to locate the shroud structure at a second target tip clearance. The second target tip clearance may be greater than the first target tip clearance. The operations may further comprise increasing, by the controller, the thrust limit of the gas turbine engine to a maximum climb thrust.

In various embodiments, identifying, by the controller, the cruise condition may comprise receiving, by the controller, a first data signal from an operational data source, determining, by the controller, an operating parameter of the gas turbine engine based on the first data signal, and determining, by the controller, the operating parameter of the gas turbine engine is within a first predetermined range for a first preselected length of time.

In various embodiments, identifying, by the controller, the cruise condition may further comprise receiving, by the controller, a second data signal from the operational data source, determining, by the controller, a flight parameter based on the second data signal and determining, by the controller, the flight parameter is within a second predetermined range for a second preselected length of time.

A method of controlling blade tip clearances in a gas turbine engine is also disclosed herein. In accordance with the various embodiments, the method may comprise identifying, by a controller, a cruise condition, reducing, by the controller, a thrust limit of the gas turbine engine to a de-rated maximum climb thrust, determining, by the controller, a first target tip clearance based on the de-rated maximum climb thrust, and sending, by the controller, a first command signal correlating to the first target tip clearance to an active clearance control system.

In various embodiments, the method may further comprise identifying, by the controller, a throttle advance, sending, by the controller, a second command signal correlating to a second target tip clearance to the active clearance control system, and increasing, by the controller, the thrust limit of the gas turbine engine to a maximum climb thrust.

In various embodiments, identifying, by the controller, the throttle advance may comprise receiving, by the controller, a data signal from an operational data source, determining, by the controller, a thrust of the gas turbine engine based on the data signal, and determining, by the controller, the thrust of the gas turbine engine is at the de-rated maximum climb thrust for a preselected length of time.

In various embodiments, the method may further comprise identifying, by the controller, a non-cruise condition, sending, by the controller, a second command signal correlating to a second target tip clearance to the active clearance control system, and increasing, by the controller, the thrust limit of the gas turbine engine to a maximum climb thrust.

In various embodiments, identifying, by the controller, the non-cruise condition may comprise receiving, by the controller, a data signal from an operational data source, determining, by the controller, a flight parameter based on the data signal, and determining, by the controller, the flight parameter is outside a predetermined range for a preselected length of time. In various embodiments, increasing, by the controller, the thrust limit of the gas turbine engine to the maximum climb thrust may occur at a preselected length of time after the step of sending, by the controller, the second command signal to the active clearance control system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
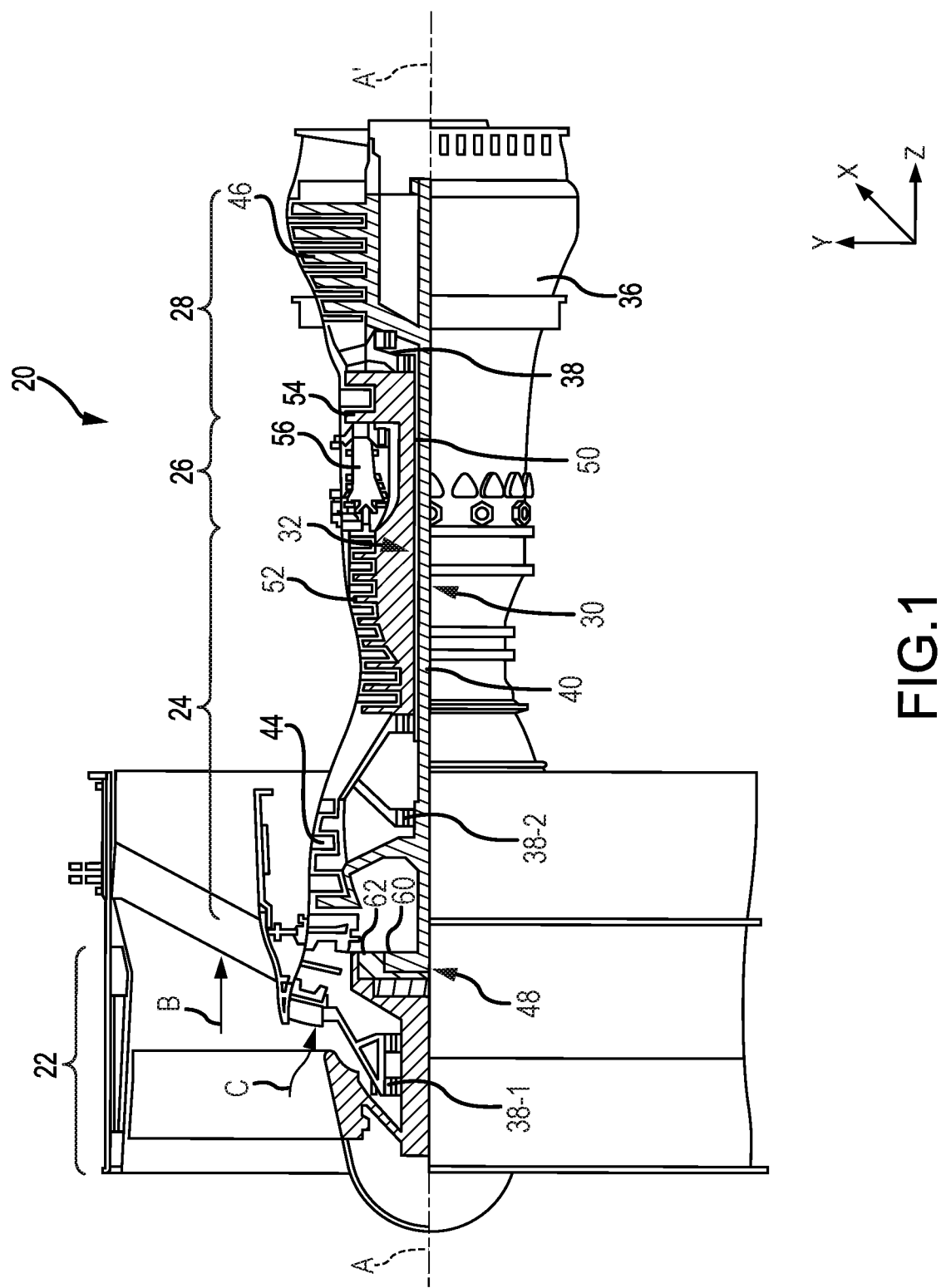
FIG. 1 illustrates, in accordance with various embodiments, a side view of a gas turbine engine.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. In operation, fan section 22 may drive fluid (e.g., air) along a bypass flow-path B while compressor section 24 drives fluid along a core flow-path C for compression and communication into combustor section 26 and then expansion through turbine section 28. Although depicted as a turbofan gas turbine engine 20 herein, it should be understood that the concepts described herein are not limited to use with turbofans as the teachings may be applied to other types of turbine engines including multi-spool architectures.

Gas turbine engine 20 may generally comprise a low speed spool 30 and a high speed spool 32 mounted for rotation about an engine central longitudinal axis A-A' relative to an engine static structure 36 via several bearing systems 38 (shown as, for example, bearing systems 38, 38-1, and 38-2 in FIG. 1). It should be understood that various bearing systems 38 at various locations may alternatively or additionally be provided, including for example, bearing system 38, bearing system 38-1, and bearing system 38-2. Engine central longitudinal axis A-A' is oriented in the z direction (i.e., axial direction) on the provided xyz axes. The y direction on the provided xyz axes refers to a radial direction and the x direction on the provided xyz axes refers to a circumferential direction.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and a high pressure turbine 54. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

A combustor 56 may be located between high pressure compressor 52 and high pressure turbine 54. The core airflow C may be compressed by low pressure compressor 44 and high pressure compressor 52, mixed and burned with fuel in combustor 56, then expanded over high pressure turbine 54 and low pressure turbine 46. Low pressure turbine 46 and high pressure turbine 54 may rotationally drive low speed spool 30 and high speed spool 32, respectively, in response to the expansion.

Compressor section 24 and turbine section 28 may each include one or more stages or sets of blades configured to rotate about engine central longitudinal axis A-A', and one or more stages or sets of stationary vanes axially interspersed with the blade stages, but which are non-rotating about engine central longitudinal axis A-A'.

Figure 2:
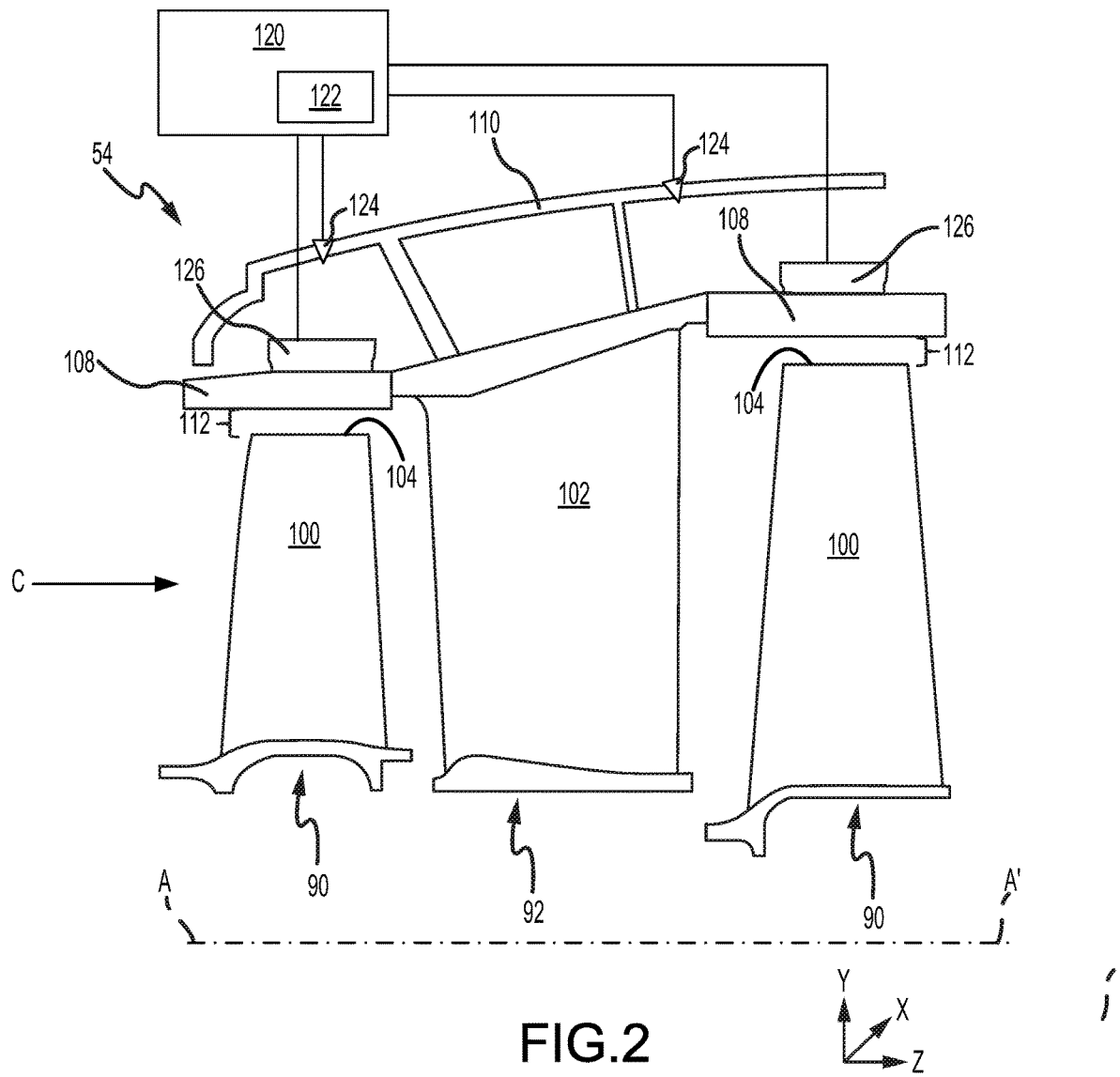
FIG. 2 illustrates, in accordance with various embodiments, a schematic cross-section of a portion of a high pressure turbine section of the gas turbine engine of FIG. 1.

With reference to FIG. 2, a portion of high pressure turbine 54 is illustrated in accordance with various embodiments. High pressure turbine 54 may include rotor assemblies 90 and vane assemblies 92 (one shown). Each rotor assembly 90 may include a plurality of rotating blades 100, while each vane assembly 92 may include a plurality of vanes 102. Blades 100 create and/or extract energy from the core airflow that is communicated along core flow path C. Vanes 102 may direct the core airflow to blades 100. Blades 100 are configured to rotate about engine central longitudinal axis A-A' in response to receiving a flow of fluid from combustor section 26 (shown in FIG. 1). Vane assemblies 92 may be coupled to a turbine case 110 of high pressure turbine 54. Turbine case 110 may form a portion of engine static structure 36 in FIG. 1

Blades 100 may be located radially inward of a shroud structure 108. Shroud structure 108 may generally surround rotating blades 100 in a hoop structure or a segmented hoop structure. Shroud structure 108 may be mounted to, or otherwise supported by, turbine case 110. In various embodiments, shroud structure 108 may comprise a blade outer air seal (BOAS). Shroud structure 108 may be spaced by a tip clearance 112 from a radially outer tip 104 of rotating blades 100. A "tip clearance" may be defined as the spacing between the radially outer end or "tip" of a blade and the radially inward surface of a shroud structure surrounding the blade.

Tip clearance 112 between blades 100 and shroud structure 108 may be controlled through an active clearance control (ACC) system 120. While FIG. 2 illustrates ACC system 120 controlling tip clearances 112 within high pressure turbine 54, it is further understood and contemplated that ACC system 120 may be employed to control tip clearances in low pressure turbine 46, high pressure compressor 52, and/or low pressure compressor 44, with momentary reference to FIG. 1.

In various embodiments, ACC system 120 may include an ACC controller 122 configured to adjust and control tip clearances 112. In various embodiments, ACC controller 122 may be in operable communication with one or more valves 124 and/or manifolds of ACC system 120 that provide warming or cooling fluid to certain areas of shroud structure 108. In this regard, ACC controller 122 may actuate valves 124 to increase or decrease fluid flow through valves 124, thereby enlarging or shrinking shroud structure 108 to adjust tip clearances 112. In various embodiments, ACC controller 122 may be in operable communication with an actuator 126 operably coupled to shroud structure 108. Actuator 126 may be configured to, upon instruction from ACC controller 122, translate shroud structure 108 towards and away from blade tip 104, thereby adjusting tip clearances 112.

Figure 3:
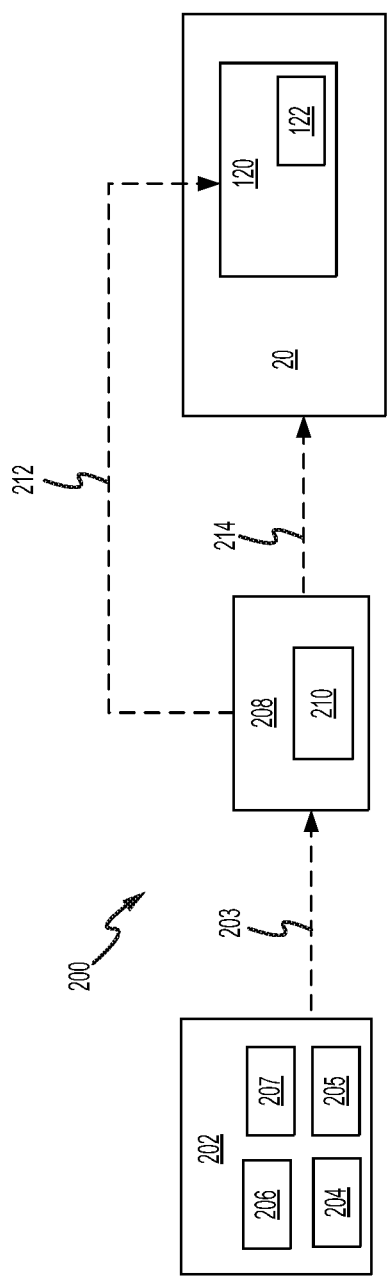
FIG. 3 illustrates, in accordance with various embodiments, a schematic diagram of a system for controlling blade tip clearance using a de-rated maximum climb thrust.

With reference to FIG. 3, a schematic diagram of a system 200 for controlling tip clearances of gas turbine engine 20 is illustrated, in accordance with various embodiments. System 200 may comprise an operational data source 202. Operational data source 202 may output data signals 203 correlating to operating parameters of gas turbine engine 20, operating parameters of an aircraft to which gas turbine engine 20 is attached, and/or to various flight parameters. Data signals 203 may be output from one or more avionics units 204, flight management systems 205, sensors 206, automatic throttle systems 207, or other sources capable of outputting engine, aircraft, and/or flight parameters and information.

Operational data source 202 may be in communication with a controller 208. In various embodiments, controller 208 may comprise a full authority digital engine control (FADEC) system. Controller 208 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 208 may be in logical and/or electronic communication with operational data source 202. In this regard, controller 208 may receive data signals 203 from one or more avionics units 204, flight management systems 205, sensors 206, automatic throttle systems 207, and/or other engine, aircraft, and/or flight data sources. Controller 208 may receive flight and operating parameters of gas turbine engine 20 from operational data source 202. For example, controller 208 may receive data signals 203 correlating to an altitude, a speed, flight time, Mach number, a rotational speed (N1) of low speed spool 30 (FIG. 1), a rotational speed (N2) of high speed spool 32 (FIG. 1), fuel output, or any other operating information. Data signals 203 may be sent to controller 208 as a voltage signal, a current signal, a digital signal, or any other suitable signal, whether filtered, conditioned, or otherwise preprocessed.

Controller 208 may include a memory 210. Memory 210 may store executable instructions and data to implement control logic of controller 208. Memory 210 may comprise a tangible, non-transitory storage medium and may store data used, for example, for trending and prognosis purposes.

In various embodiments, and with combined reference to FIG. 3 and FIG. 2, controller 208 may use data received from operational data source 202 to determine a tip clearance 112 for a particular flight condition (e.g., take-off, cruise, etc.). In various embodiments, controller 208 may be configured to identify a cruise, or steady state, condition by determining that one or more flight parameters (e.g., altitude, flight time, speed, etc.) is/are within a preselected range for a preselected period of time and/or by determining that one or more engine operating parameters (e.g., N1, N2, temperature, fuel supply, etc.) is within a preselected range for a preselected period of time. For example, if controller 208 determines the altitude is within a preselected altitude range for a preselected length of time and the N2 is within a preselected N2 range for a preselected length of time, controller 208 may determine that gas turbine engine 20 is operating at a cruise condition.

Controller 208 may then determine a target tip clearance (i.e., at what distance tip clearance 112 should be set) for the cruise condition. Controller may send a command signal 212 to ACC system 120 correlating the to the target tip clearance. In response to receiving the command signal, ACC system 120 may adjust tip clearance 112 to the target tip clearance. In various embodiments, controller 208 may be simultaneously controlling and monitoring multiple ACC systems and multiple tip clearances.

In various embodiments, controller 208 may determine the target tip clearance based on a maximum climb (MCL) thrust for gas turbine engine 20 (i.e., maximum possible increase in the rate of thrust at a particular altitude parameter). For example, controller 208 may be configured to calculate a tip clearance 112 that allows for the centrifugal growth of blades 100 caused by the increased rotor speed (i.e., N2) of gas turbine engine 20 at MCL thrust. Stated differently, tip clearance 112 is selected to prevent, or decrease, occurrences of the centrifugal growth of blades 100, associated with MCL thrust rotor speed (i.e., N2), causing blade tips 104 to contact shroud structure 108. In various embodiments, the target tip clearance may be a function of an instantaneous, or "real-time," rotor speed (e.g., N1 and/or N2 of gas turbine engine 20), and ACC system 120 may be configured to alter and control a diameter of shroud structure 108 to achieve the target tip clearance. For example, ACC system 120 may set the diameter of shroud structure 108 to a diameter (i.e., target tip clearance) that allows a radial length of blades 100 to vary (i.e., tip clearance 112 to vary), as rotor speed changes, without blade tips 104 contacting shroud structure 108.

In various embodiments, controller 208 may be configured to reduce a thrust limit (e.g., an N2 limit) of gas turbine engine 20 to a de-rated MCL thrust, when gas turbine engine 20 is operating at the cruise condition. In this regard, controller 208 may set a thrust limit of gas turbine engine 20 to a de-rated (i.e., reduced) MCL thrust. In various embodiments, controller 208 may determine the de-rated MCL thrust based on the MCL thrust. For example, the de-rated MCL thrust may be a percentage (e.g., 98%, 95%, 90%, 80%, etc.) of the MCL thrust. Stated differently, controller may determine the de-rated MCL thrust by reducing the MCL thrust by a preselected percentage (e.g., by 2%, 5%, 10%, etc.).

In various embodiments, controller 208 may determine the de-rated MCL thrust based on the thrust or N2 of gas turbine engine 20 at the cruise condition. For example, controller 208 may receive data signals 203 from operational data source 202 (e.g., from automatic throttle system 109) correlating to a minimum thrust or minimum N2 needed to maintain a cruise speed and cruise altitude, and the de-rated MCL thrust may be a preselected percentage (e.g., 5%, 10%, 15%, etc.) above the minimum thrust or minimum N2.

In various embodiments, controller 208 may be configured to set the thrust or N2 limit of gas turbine engine 20 as low as possible without interfering with the cruise operation of gas turbine engine 20. Controller may send a signal 214 to gas turbine engine 20 correlating the thrust limit. In response to receiving signal 214, gas turbine engine may limit N2 such that N2 does not exceed the de-rated MCL thrust. Reducing the thrust limit to the de-rated MCL thrust may allow for tighter tip clearances 112 at cruise conditions (relative to tip clearances 112 needed for an MCL thrust limit), as the blade growth generated at the N2 of the de-rated MCL thrust tends to be less than the blade growth generated at the N2 of the MCL thrust.

Figure 4A:
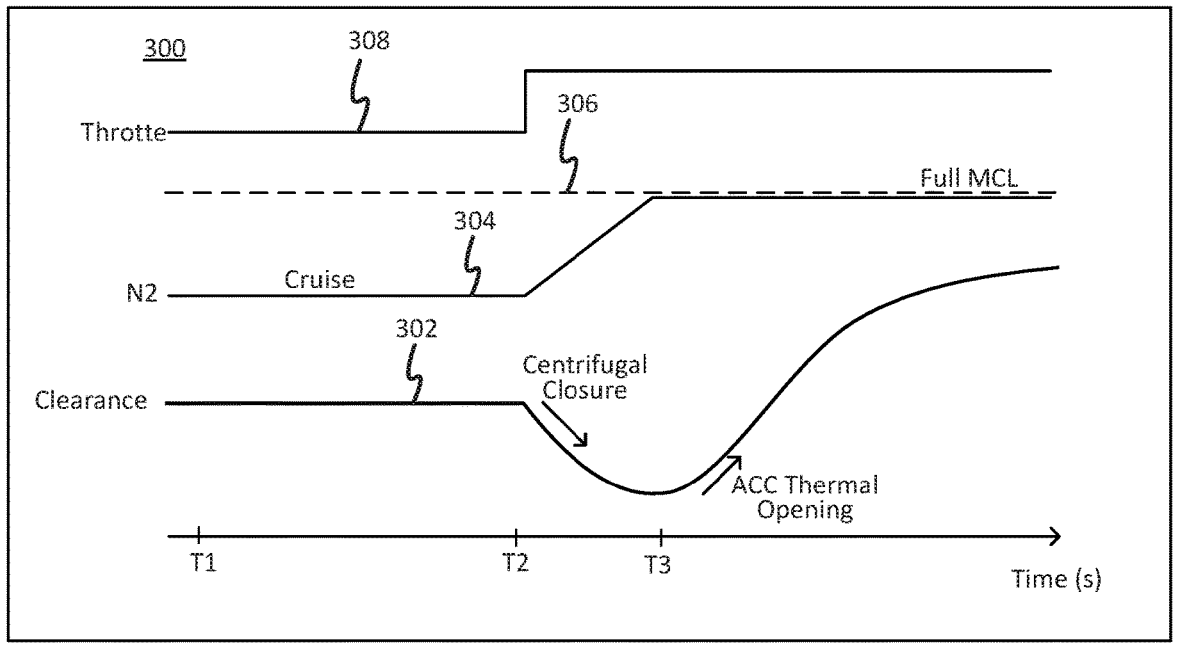
FIG. 4A illustrates, in accordance with various embodiments, a graphical representation of blade tip clearances and turbine rotor speed (N2) in response to a throttle advance and with a maximum climb thrust limit.

With reference to FIG. 4A, a graphical representation 300 showing various operating parameters when a thrust limit of the gas turbine engine is set to an MCL thrust is illustrated, in accordance with various embodiments. With combined reference to FIG. 4A and FIG. 2, line 302 illustrates a tip clearance (e.g., tip clearance 112) at various times (t). Line 304 illustrates N2 of gas turbine engine 20 at various times (t). Line 306 illustrates a thrust limit. Line 308 illustrates a throttle position signal. At time T1, N2 is at a cruise condition and tip clearance 112 is set at a target tip clearance configured to accommodate a blade growth associated with an increase in N2 to thrust limit 306. Thrust limit 306 corresponds to a MCL thrust. At time T2, throttle position signal 308 increases, indicating a throttle advance. The throttle advance causes N2 to begin increasing. The increase in N2 causes growth of blades 100 and a decrease in tip clearance 112, as translation of shroud structure 108 is generally slower than the centrifugal growth of blades 100. N2 continues to increase until thrust limit 306 (i.e., the MCL thrust) is reached at time T3. At time T3, blade tip clearance 112 may also begin to increase as shroud structure 108 begins to translate away from blades 100 due to actuation of valves 124 and/or of actuator 126.

Figure 4B:
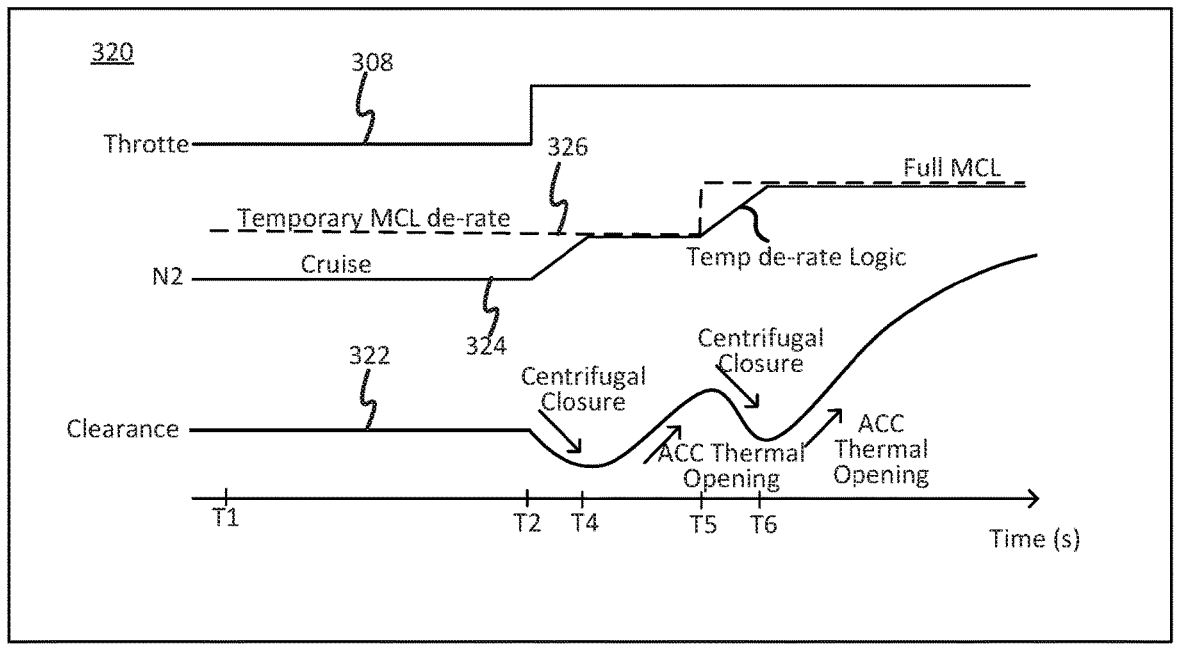
FIG. 4B illustrates, in accordance with various embodiments, a graphical representation of blade tip clearances and turbine rotor speed (N2) in response to a throttle advance request when a de-rated maximum climb thrust limit is implemented.

With reference to FIG. 4B, a graphical representation 320 showing various operating parameters when a thrust limit of the gas turbine engine is reduced to a de-rated MCL thrust is illustrated, in accordance with various embodiments. With combined reference to FIG. 4B and FIG. 2, line 322 illustrates a tip clearance (e.g., tip clearance 112) at various times (t). Line 324 illustrates N2 of gas turbine engine 20 at various times (t). Line 326 illustrates a thrust limit. Line 308 illustrates a throttle position signal. At time T1, N2 is at a cruise condition and tip clearance 112 is set at a target tip clearance configured to accommodate a blade growth associated with an increase in N2 to thrust limit 326. While in the cruise condition, thrust limit 326 may correspond to a de-rated MCL thrust. Stated differently thrust limit 326 is less than thrust limit 306 in FIG. 4A. At time T2, throttle position signal 308 increases, indicating a throttle advance. The throttle advance causes N2 to begin increasing. The increase in N2 causes growth of blades 100 and a decrease in tip clearance 112. N2 continues to increase until thrust limit 326 (i.e., the de-rated MCL thrust) is reached at time T4. At time T4, blade tip clearance 112 may begin to increase as shroud structure 108 begins to translate away from blades 100 due to actuation of valves 124 and/or of actuator 126. The target tip clearance at cruise may be selected to accommodate a blade growth associated with an increase in N2 to the de-rated MCL thrust. After N2 has been at thrust limit 326 for a predetermined length of time (i.e., from time T4 to time T5), thrust limit 326 is increased to the MCL thrust. In various embodiments, the increase to MCL thrust may occur a preselected amount of time after the non-cruise state has been identified (i.e., after N2 has been at the de-rated MCL thrust for the predetermined length of time). In various embodiments, the preselected amount of time before increasing to MCL thrust may correspond to the time it takes for tip clearance 112 to increase to a target MCL tip clearance (i.e., a tip clearance capable of accommodating blade growth associated with an increase in N2 to the MCL thrust). Stated differently, after the preselected amount of time, tip clearance 112 may be approximately equal to the MCL target tip clearance from time T1 to time T2 in FIG. 4A. In various embodiments, the length of time between identifying the non-cruise state and increasing to MCL thrust may be model-based. In various embodiments, thrust limit 326 may be increased to MCL thrust in response to real-time data indicating that tip clearance 112 is at the MCL target tip clearance.

The increase in thrust limit 326 to the MCL thrust at time T5 causes N2 to begin increasing. The increase in N2 causes growth of blades 100 and a decrease in tip clearance 112. N2 continues to increase until thrust limit 326 (i.e., the MCL thrust) is reached at time T6. At time T6, blade tip clearance 112 may begin to increase as shroud structure 108 begins to translate away from blades 100 due to actuation of valves 124 and/or of actuator 126. In various embodiment, thrust limit 326 may be increased to the MCL thrust in response to identification of a non-cruise condition. The non-cruise condition may be identified by controller 208 determining that a flight parameter (e.g., altitude, flight time, etc.) is outside a predetermined range for a preselected period of time.

The blade tip clearance 112 at the cruise condition in FIG. 4B (i.e. when the thrust limit is set at to the de-rated MCL thrust) is less than the blade tip clearance at the cruise condition in FIG. 4A (i.e. when the thrust limit is set at to the MCL thrust). The decreasing tip clearance at cruise conditions may decrease thrust specific fuel consumption (TSFC) and/or lower operating temperatures.

Figure 5A:
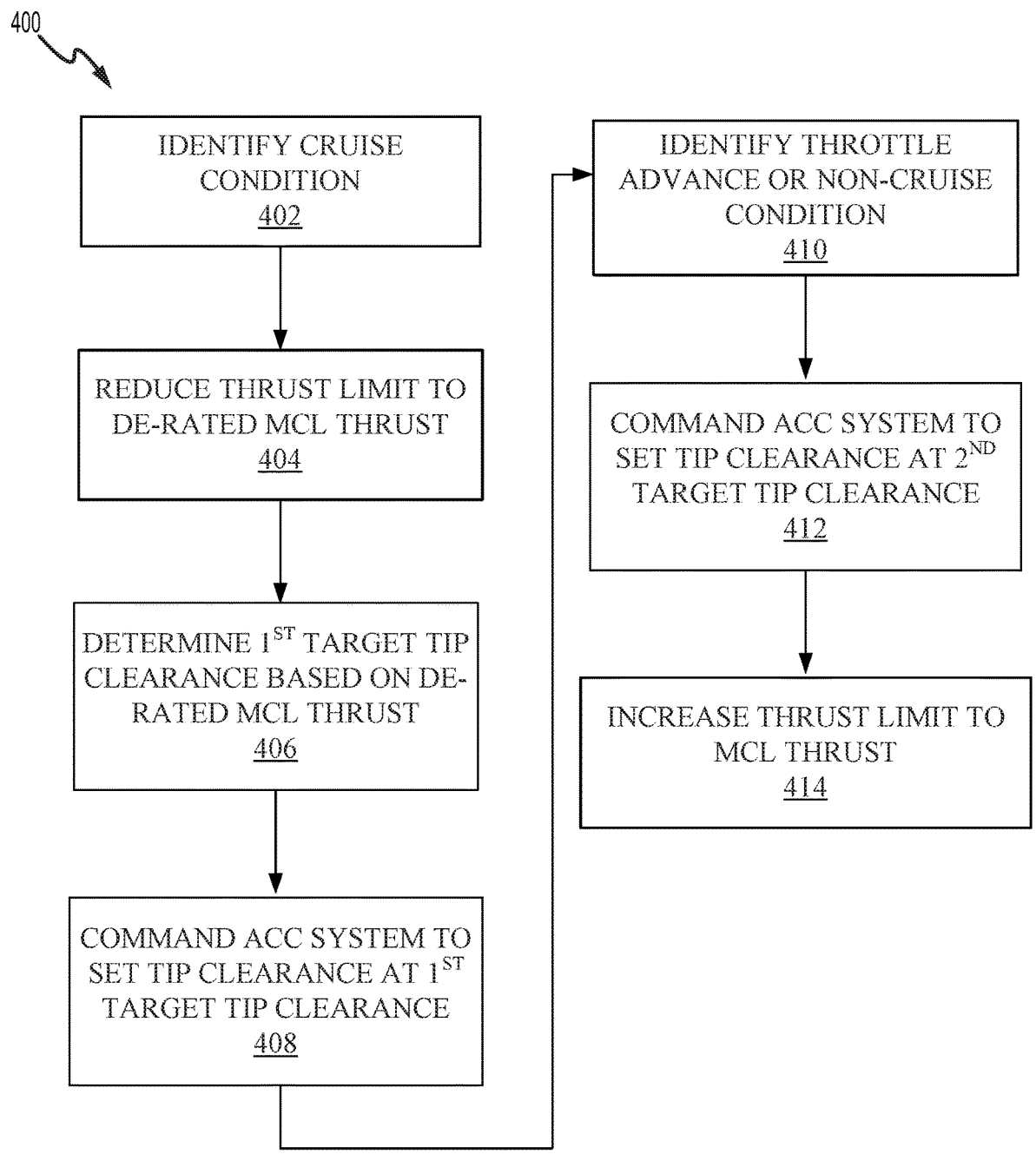
FIGS. 5A, 5B, 5C, and 5D illustrate, in accordance with various embodiments, a method of controlling blade tip clearance using a de-rated maximum thrust limit.

With reference to FIG. 5A, a method 400 for controlling blade tip clearance in a gas turbine engine is illustrated, in accordance with various embodiments. Method 400 may include identifying a cruise condition (step 402), reducing a thrust limit of the gas turbine engine to a de-rated maximum climb thrust (step 404), determining a first target tip clearance based on the a de-rated maximum climb thrust (step 406), and commanding an ACC system to set the tip clearance to the first target tip clearance (step 408).

In various embodiments, method 400 may further include identifying a throttle advance or a non-cruise condition (step 410), commanding the ACC system to set the tip clearance to a second target tip clearance (step 412), and increasing the thrust limit of the gas turbine engine to a maximum climb thrust (step 414). In various embodiments, the increase to the maximum climb thrust (step 414) may occur a preselected amount of time after the second target tip clearance command signal is sent to the ACC system (step 412). The time (i.e., delay) between steps 412 and 414 is selected to allow the tip clearance (i.e., shroud structure diameter) to increase before the thrust limit is increased.

Figure 5B:
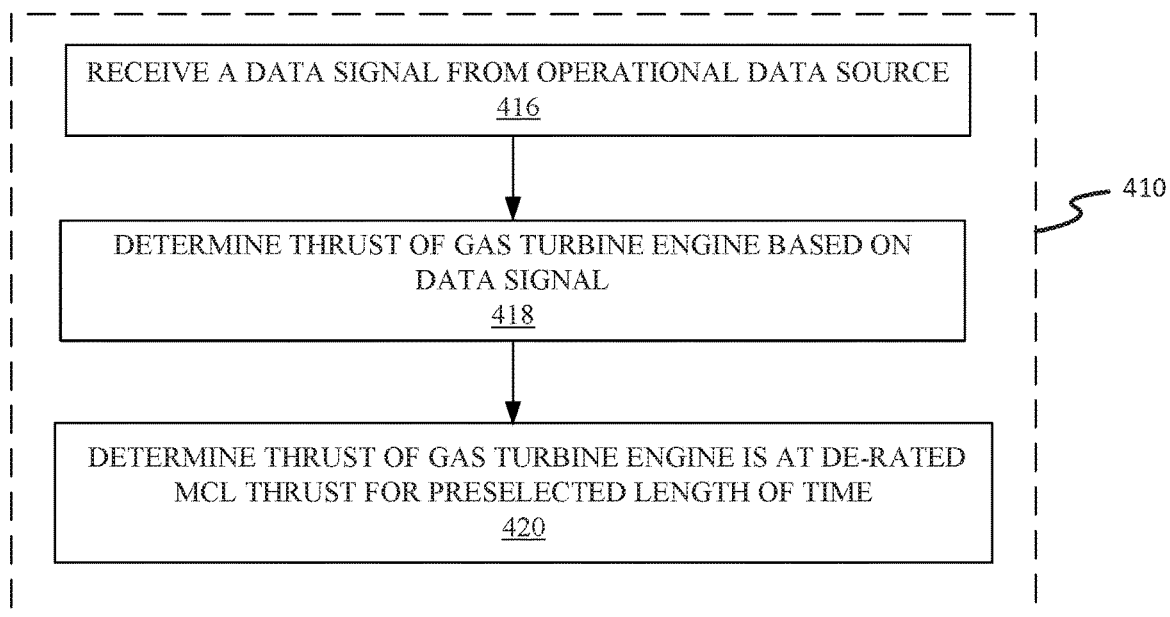

With reference to FIG. 5B, in various embodiments, identifying the throttle advance in step 410 may include receiving a data signal from an operational data source (step 416), determining a thrust of the gas turbine engine based on the data signal (step 418), and determining the thrust of the gas turbine engine is at the de-rated maximum climb thrust for a preselected length of time (step 420).

Figure 5C:
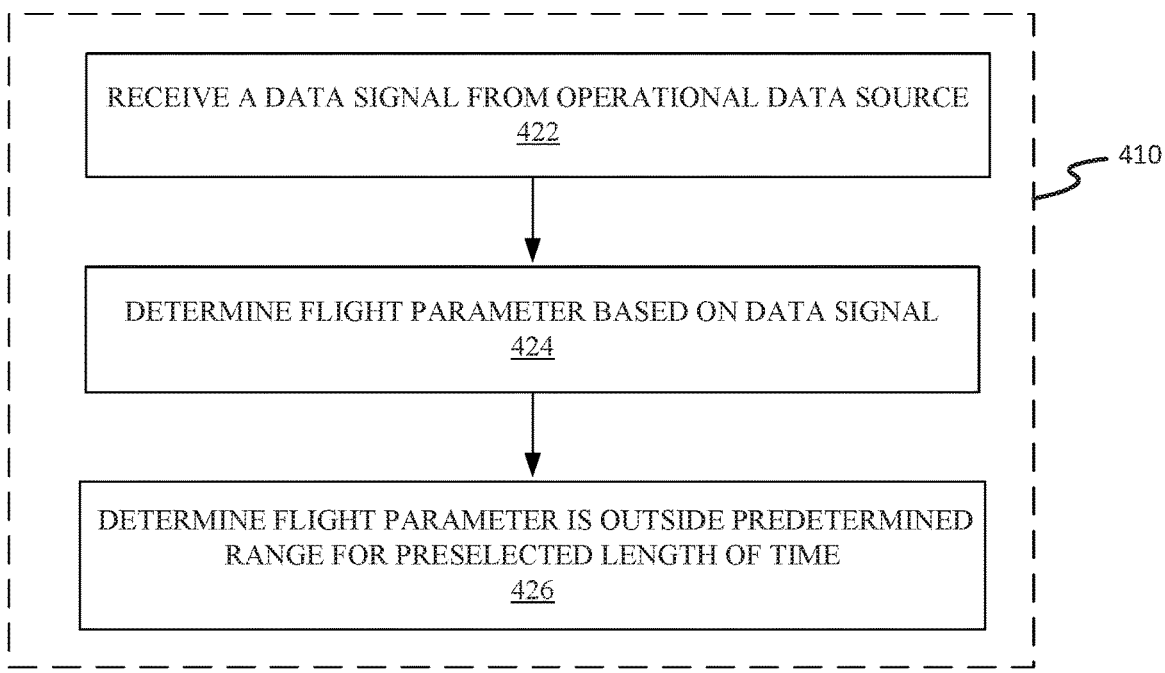

With reference to FIG. 5C, in various embodiments, identifying the non-cruise condition in step 410 may include receiving a data signal from an operational data source (step 422), determining a flight parameter based on the data signal (step 424), and determining the flight parameter is outside a predetermined range for a preselected length of time (step 426).

Figure 5D:
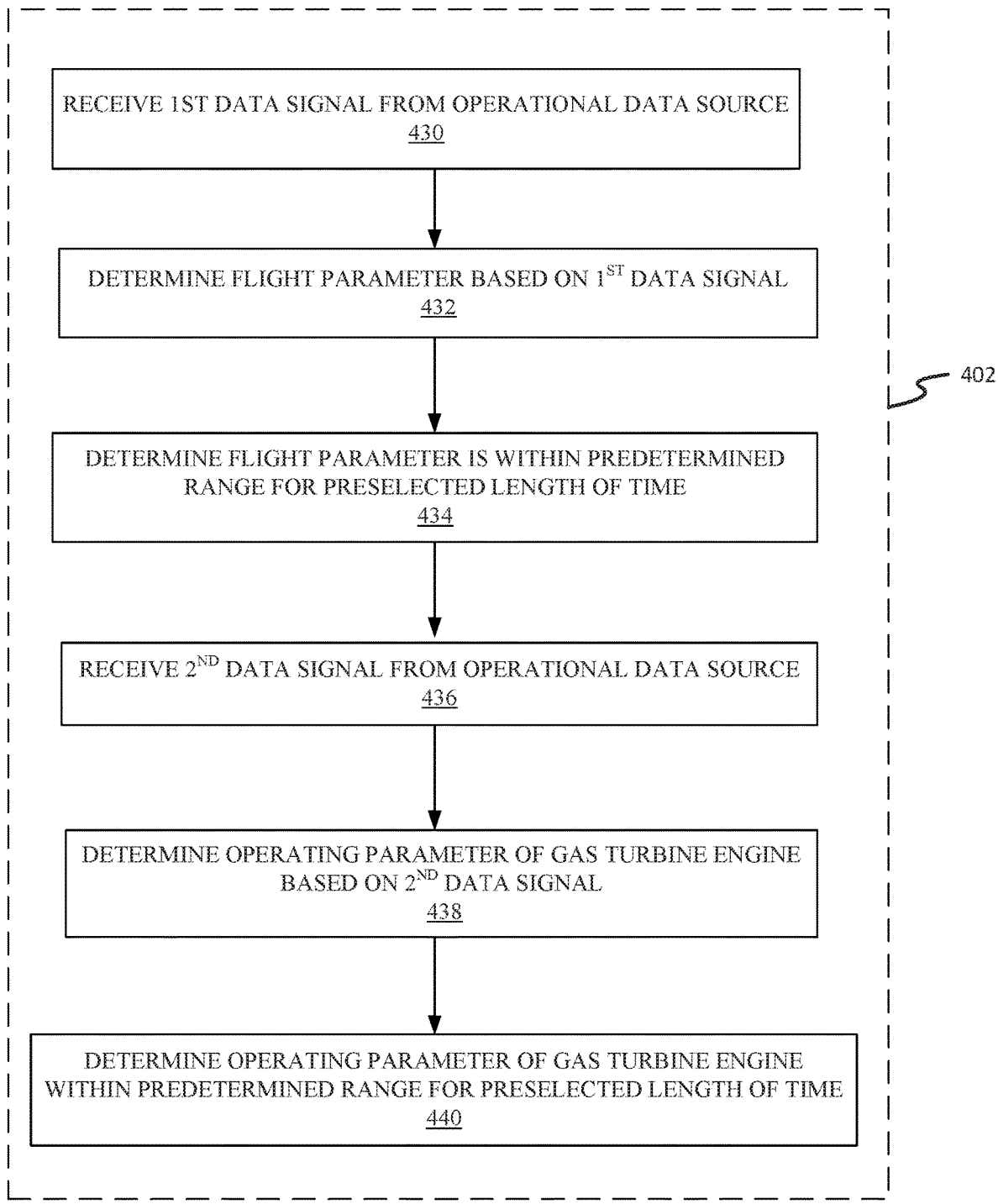

With reference to FIG. 5D, In various embodiments, step 402 may include receiving a first data signal from an operational data source (step 430), determining a flight parameter based on the first data signal (step 432),and determining the flight parameter is within a first predetermined range for a first preselected length of time (step 434). In various embodiments, step 402 may further include receiving a second data signal from the operational data source (step 436) determining an operating parameter of the gas turbine engine based on the second data signal (step 438), and determining the operating parameter of the gas turbine engine is within a second predetermined range for a second preselected length of time (step 440).

In various embodiments, the de-rated maximum climb thrust may be determined by reducing the maximum climb thrust by a preselected percentage. In various embodiments, the de-rated maximum climb thrust may be determined by receiving a data signal corresponding to a minimum thrust at the cruise condition, and determining the de-rated maximum climb thrust by increasing the minimum thrust by a preselected percentage.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling blade tip clearance in a gas turbine engine, the system comprising:
   an active clearance control system configured to regulate a tip clearance between a blade of the gas turbine engine and a shroud structure radially outward of the blade;
   a controller in operable communication with the active clearance control system;
   an operational data source in communication with the controller; and
   a tangible, non-transitory memory configured to communicate with the controller, the tangible, non-transitory memory having instructions stored thereon that, in response to execution by the controller, cause the controller to perform operations comprising:
      identifying, by the controller, a cruise condition based on data output by the operational data source;
      reducing, by the controller, a thrust limit of the gas turbine engine to a de-rated climb thrust in response to identifying the cruise condition, wherein the thrust limit is a turbine rotor rotational speed limit;
      determining, by the controller, a first target tip clearance based on the de-rated climb thrust;
      commanding, by the controller, the active clearance control system to set the tip clearance to the first target tip clearance;
      identifying, by the controller, a non-cruise condition by determining a rotational speed of a turbine rotor of the gas turbine engine corresponds to the turbine rotor rotational speed limit for a threshold duration of time;
      commanding, by the controller, the active clearance control system to set the tip clearance to a second target tip clearance, in response to the controller determining the rotational speed of the turbine rotor was at the turbine rotor rotational speed limit for the threshold duration of time, wherein the second target tip clearance is greater than the first target tip clearance; and
      increasing, by the controller, the thrust limit of the gas turbine engine to a climb thrust that is greater than the de-rated climb thrust, after commanding the active clearance control system to set the tip clearance to the second target tip clearance.

2. The system of claim 1, wherein the identifying, by the controller, the non-cruise condition further comprises:
   receiving, by the controller, a signal from a turbine rotational speed sensor; and
   determining, by the controller, the rotational speed of the turbine rotor based on the signal from the turbine rotational speed sensor.

3. The system of claim 1, wherein the identifying, by the controller, the non-cruise condition further comprises:
   receiving, by the controller, a data signal from the operational data source;
   determining, by the controller, a flight parameter based on the data signal; and
   determining, by the controller, the flight parameter is outside a predetermined range for a predetermined length of time.

4. The system of claim 1, wherein the identifying, by the controller, the cruise condition comprises:
   receiving, by the controller, a first data signal from the operational data source;
   determining, by the controller, a flight parameter based on the first data signal; and
   determining, by the controller, the flight parameter is within a first predetermined range for a first predetermined length of time.

5. The system of claim 4, wherein the identifying, by the controller, the cruise condition further comprises:
   receiving, by the controller, a second data signal from the operational data source;
   determining, by the controller, an operating parameter of the gas turbine engine based on the second data signal; and
   determining, by the controller, the operating parameter of the gas turbine engine is within a second predetermined range for a second predetermined length of time.

6. The system of claim 1, wherein the operations further comprise determining, by the controller, the de-rated climb thrust by reducing a maximum climb thrust of the gas turbine engine by a predetermined percentage.

7. The system of claim 1, wherein the operations further comprise:
   receiving, by the controller, a data signal corresponding to a minimum thrust associated with maintaining the cruise condition; and
   determining, by the controller, the de-rated climb thrust by increasing the minimum thrust by a predetermined percentage.

8. A gas turbine engine, comprising:
   a combustor;
   a turbine aft of the combustor, the turbine comprising:
      a blade configured to rotate about an axis, and
      a shroud structure disposed radially outward of the blade;
   a controller configured to regulate a tip clearance between the blade and the shroud structure; and
   a tangible, non-transitory memory configured to communicate with the controller, the tangible, non-transitory memory having instructions stored thereon that, in response to execution by the controller, cause the controller to perform operations comprising:
      identifying, by the controller, a cruise condition based on at least one of a flight parameter or an engine operating parameter;
      reducing, by the controller, a thrust limit of the gas turbine engine to a de-rated climb thrust in response to identifying the cruise condition, wherein the thrust limit is a turbine rotor rotational speed limit;
      determining, by the controller, a first target tip clearance based on the de-rated climb thrust;
      sending, by the controller, a first command signal configured to locate the shroud structure at the first target tip clearance;
      identifying, by the controller, a non-cruise condition by determining a thrust of the gas turbine engine corresponds to the de-rated climb thrust for a threshold duration of time;
      sending, by the controller, a second command signal configured to locate the shroud structure at a second target tip clearance, in response to identifying the non-cruise condition, wherein the second target tip clearance is greater than the first target tip clearance; and
      increasing, by the controller, the thrust limit of the gas turbine engine, after sending the second command signal.

9. The gas turbine engine of claim 8, wherein the determining the thrust of the gas turbine engine corresponds to the de-rated climb thrust for the threshold duration of time comprises:
   receiving, by the controller, a data signal from a sensor configured to detect a rotational speed of the turbine; and
   determining, by the controller, the rotational speed of the turbine corresponds to the turbine rotor rotational speed limit for the threshold duration of time.

10. The gas turbine engine of claim 8, wherein the identifying, by the controller, the cruise condition comprises:
    receiving, by the controller, a first data signal from an operational data source;
    determining, by the controller, the engine operating parameter of the gas turbine engine based on the first data signal; and
    determining, by the controller, the engine operating parameter of the gas turbine engine is within a first predetermined range for a first predetermined length of time.

11. The gas turbine engine of claim 10, wherein the identifying, by the controller, the cruise condition further comprises:
    receiving, by the controller, a second data signal from the operational data source;
    determining, by the controller, the flight parameter based on the second data signal; and
    determining, by the controller, the flight parameter is within a second predetermined range for a second predetermined length of time.

* * * * *